United States Patent [19]
Clark et al.

[11] Patent Number: 5,912,281
[45] Date of Patent: Jun. 15, 1999

[54] POLYESTER/ACRYLIC HYBRID LATEXES FOR PRINTING INKS WITH IMPROVED REWETTABILITY

[75] Inventors: Mark Dwight Clark; Leslie Elaine Peterson-Bishop, both of Kingsport, Tenn.

[73] Assignee: Eastman Chemical Company, Kingston, Tenn.

[21] Appl. No.: 08/891,921

[22] Filed: Jul. 14, 1997

[51] Int. Cl.$^6$ .................................................. C09D 5/00
[52] U.S. Cl. ............................................ 523/161; 524/513
[58] Field of Search .............................. 523/161; 524/513

[56] References Cited

U.S. PATENT DOCUMENTS

| | | |
|---|---|---|
| 4,939,233 | 7/1990 | Jenkins et al. . |
| 4,946,932 | 8/1990 | Jenkins . |
| 5,268,412 | 12/1993 | Raynolds ................................ 524/513 |
| 5,274,025 | 12/1993 | Stockl ..................................... 524/513 |
| 5,342,877 | 8/1994 | Clark ...................................... 524/513 |
| 5,344,872 | 9/1994 | Debord ................................... 524/513 |

FOREIGN PATENT DOCUMENTS

WO 94 01478  1/1994  WIPO .

*Primary Examiner*—Paul R. Michl
*Attorney, Agent, or Firm*—Rose M. Allen; Harry J. Gwinnell

[57] ABSTRACT

An aqueous-dispersion comprising a polyester (A) having repeat units from at least one dicarboxylic acid, at least one difunctional sulfomonomer containing at least one metal sulfonate group attached to an aromatic nucleus wherein said functional groups are carboxyl or hydroxyl, and at least one difunctional glycol; and a polymer (B) having repeat units from styrene or one or more derivatives of styrene; a hydroxyalkyl(meth)-acrylate; and a carboxyl group containing monomer selected from methacrylic acid, acrylic acid, itaconic acid and mixtures thereof. Polymer (B) is formed from monomers polymerized in the presence of an aqueous dispersion of polyester (A). The aqueous dispersion may be used in various coatings and inks having excellent water resistance, alkaline resistance, and redispersibility.

19 Claims, No Drawings

POLYESTER/ACRYLIC HYBRID LATEXES FOR PRINTING INKS WITH IMPROVED REWETTABILITY

FIELD OF THE INVENTION

This invention relates to blends of water-dispersible polyesters or polyamides with polymers containing styrene/hydroxyalkyl(meth)acrylate and methacrylic, acrylic or itaconic add, to form aqueous dispersions having excellent water resistance, alkaline resistance and rewettability.

DESCRIPTION OF THE RELATED ART

A number of water-dispersed polymer systems for waterborn inks and overprint varnishes are readily coatable onto paper, plastic or metal substrate. Such polymeric systems are disclosed in the following patents:

U.S. Pat. No. 4,946,932, assigned to Eastman Kodak Company, discloses water-dispersible polymer and polyester amide blends with certain vinyl polymers.

U.S. Pat. No. 4,939,233, assigned to Eastman Kodak Company, discloses an aqueous dispersion comprising a water-dispersible polyester or polyester amide and a vinyl polymer having a majority of repeat units from vinyl acetate wherein the latex polymer is formed via emulsion polymerization of the vinyl monomer in the presence of an aqueous dispersion of the polyester or polyester amide. However, some of these polymeric materials retain an undesirable water sensitivity when the coatings are dried. This water sensitivity can result in blocking or transfer of color if the wet surface comes in contact with another substrate. Such sensitivity can also result in total removal of the ink film from non-porous substances such as plastic film or metal foil.

U.S. Pat. No. 5,342,877, assigned to Eastman Chemical Company, discloses an aqueous polymer dispersion comprising a blend of a polyester or polyamide polymer with an acrylate polymer, wherein the acrylate polymer comprises styrene, hydroxyalkyl(meth)acrylate and optionally, alkyl (meth)acrylate. These polymeric materials are described as having excellent dry- and wet-block resistance in overprinting applications and excellent water resistance, adhesion and printability in ink applications.

It is well known to those skilled in the art that during a printing operation, it may become necessary to stop the printing equipment. When this occurs, the printing ink can partially or totally dry on the surface of the printing equipment. This film can cause significant reduction in print quality and/or increase in production down-time due to equipment clean-up. It is therefore highly desirable that, for some finite period of time, the ink film remain redispersible in the fluid printing ink such that simply rotating the equipment through the fluid ink is sufficient to remove any dried film from the equipment. One approach to obtaining redispersibility or rewet in waterborne ink systems is to modify the polymer with a functionality (e.g. carboxylic acid) which can be neutralized, typically with a volatile base, to enhance water-dispersibility of the dried film. However, the same functionality which imparts redispersibility on the printing equipment can disadvantageously serve to redisperse the printed film on exposure to alkaline solution. Thus, there is a need to have a water dispersible polymeric composition for coatings and ink applications, having excellent water resistance, alkaline resistance and rewettability.

SUMMARY OF THE INVENTION

Applicants have discovered novel compositions with the unexpected performance of both alkaline self-redispersibility and alkaline-resistance in ink formulations, thus, overcoming the above-mentioned drawbacks of the prior art materials.

Accordingly, there is provided an aqueous polymer dispersion comprising a polyester (A) and a polymer (B). The aqueous dispersion of the present invention contains about 5–40% of polyester (A) and about 95–40% of polymer (B), both percentages being based on the combined weight of polyester (A) and polymer (B).

DESCRIPTION OF THE PREFERRED EMBODIMENTS

The present invention provides an aqueous polymer dispersion comprising a polyester (A) and a polymer (B). The polymer dispersion is formed by dispersing polyester (A) in an aqueous medium and subsequently polymerizing, in the presence of polyester (A), components (1), (2), (3) and optionally (4), of polymer (B), as described below.

Polyester (A)

Polyester (A) is formed by the reaction of the following components:

(1) at least one difunctional aromatic, saturated aliphatic or saturated alicyclic dicarboxylic acid;

(2) at least one difunctional sulfomonomer containing at least one metal sulfonate group attached to an aromatic nucleus, wherein the functional groups are hydroxy or carboxyl, this monomer being present in an amount from about 4 to about 25 mol %, based on a total of all acid and hydroxyl equivalents being equal to 200 mol %;

(3) at least one difunctional reactant selected from a glycol or a mixture of a glycol and diamine having two -NRH groups, the glycol containing two —$CH_2$—OH groups; and (4) optionally, at least one difunctional reactant selected from a hydroxycarboxylic acid having one —$CR_2$—OH, an aminocarboxylic acid having one —NRH group, an amino-alcohol having one —CR2—OH group and one —NRH or mixtures thereof, wherein each R is an H atom or an alkyl group of 1 to 4 carbon atoms.

Component (1) is at least one difunctional aromatic, saturated aliphatic or saturated alicyclic dicarboxylic acid. The dicarboxylic acid component of the polyester may be selected from aliphatic dicarboxylic acids, alicyclic dicarboxylic acids, aromatic dicarboxylic adds,or mixtures of two or more of these acids. Examples of such dicarboxylic acids, include succinic, glutaric, adipic, azelaic, sebacic, 1,4-cyclohexanedicarboxylic, phthalic, terephthalic and isophthalic acid. Terephthalic acid and isophthalic acid are preferred as the dicarboxylic acid component of the polyester. It should be understood that use of the corresponding acid anhydrides, esters, and acid chlorides of these acids is included in the term "dicarboxylic acid."

Component (2) is at least one difunctional sulfomonomer containing at least one metal sulfonate group attached to an aromatic nucleus wherein the functional groups are hydroxy or carboxyl, the sulfomonomer being present in an amount from about 4 to about 25 mol %, based on a total of all acid and hydroxyl equivalents being equal to 200 mol %.

The difunctional sulfomonomer component of the polyester may advantageously be a dicarboxylic acid or an ester thereof containing a metal sulfonate group, a glycol containing a metal sulfonate group or a hydroxy acid containing a metal sulfonate group or a hydroxy acid containing a metal sulfonate group. The-metal ion of the sulfonate salt may be Na+, Li+, K+ and the like. When a monovalent alkali metal ion is used, the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare the polyester using, for example, a sodium sulfonate salt and latex by ion-exchange replacement of this ion with a different ion, and thus alter the characteristics of the polymer. The difunctional monomer component may also be referred to the difunctional sulfomonomer and is further described herein below.

Advantageous difunctional sulfomonomer components are those wherein the sulfonate salt group is attached to an aromatic acid nucleus such as benzene, naphthalene, diphenyl, oxyphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional sulfomonomer component is 5-sodiosulfoisophthalic acid or its esters, and the glycol is a mixture of ethylene glycol or 1,4cyclohexanedimethanol with diethylene glycol.

Component (3) is at least one difunctional reactant selected from a glycol or a mixture of a glycol and diamine having two —NRH groups, the glycol containing two —CH$_2$—OH groups. Preferably, the glycol contains some poly(ethylene glycol) to aid in its water dispersibility. When some poly(ethylene glycol) is used, the content of the sulfomonomer can be lower, which aids in flexibility of formulating the polyester.

The water dispersibility of the polyester is related to the weight % of poly(ethylene glycol) and mol % of sulfomonomer. Therefore, if the content of either is relatively low, the other should be relatively high to maintain adequate dispersibility. The poly(ethylene glycol) need not be present in the initial reaction charge, because poly(ethylene glycol) may form in situ from decomposition products and be incorporated into the polyester chain. It is well known, for example, that diethylene glycol is formed in situ in such reactions.

In a preferred form of the present invention, the polyester contains repeating units of a poly(ethylene glycol) of the formula H—(OCH$_2$—CH$_2$)$_n$—OH wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

Examples of suitable poly(ethylene glycols) include relatively high molecular weight poly(ethylene glycols), some of which are available commercially under the designation "Carbowax", a product of Union Carbide. Diethylene glycol is also especially suitable. Other useful glycols for preparing copolyester may consist of aliphatic, alicyclic and aralkyl glycols. Examples of these glycols include ethylene glycol, propylene glycol, 1,3-propanediol, 2,4-dimethyl-2-ethylhexane 1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6, hexanediol, thiodiethanol, 1,2-cyclohexanedimethanol, 1,3-cyclohexanedimethanol, 1,4-cyclohexanedimethanol, 2,2,4, 4,-tetramethyl-1,3-cyclobutanediol, and p-xylylenediol.

Component (4) is optionally, a difunctional reactant selected from a hydroxycarboxylic acid having one —CR$_2$—OH, an aminocarboxylic acid having one —NRH group, an amino-alcohol having one —CR$_2$—OH group and one —NRH or mixtures thereof may be incorporated into polyester (A). In these formulae, each R is independently an H atom or an alkyl group of 1 to 4 carbon atoms.

Polyester (A) comprising the above components is a linear water-dispersible polymer having carbonyloxy linking groups in the linear molecular structure where up to 80% of the linking groups may be carbonylamido linking groups. The polyester has an inherent viscosity of at least about 0.1 measured in a 60/40 parts by weight solution of phenol/tetrachloroethane at 25° C. and at a concentration of about 0.25 g of polymer in 100 ml of the solvent. The polyester may contain substantially equimolar proportions of acid equivalents (100 mol %) to hydroxy and amino equivalents (100 mol %).

It is preferred that polyester (A) have repeat units of isophthalic acid, 5-sodiosulfoisophthalic acid, diethylene glycol, and another glycol selected from at least one of ethylene glycol and 1,4-cyclohexanedimethanol.

Polymer (B)

Polymer (B) has repeat units derived from:
(1) about 20 to about 80% by weight styrene or one or more derivatives of styrene;
(2) about 7.5 to about 48% by weight of a hydroxyalkyl (meth)acrylate selected from 2-hydroxyethylmethacrylate, hydroxyethylacrylate, and hydroxypropylacrylate;
(3) about 2 to about 25% by weight of a carboxyl containing monomer selected from methacrylic acid, acrylic acid, itaconic acid and mixtures thereof; and
(4) optionally up to about 60% by weight of an alkyl (meth)acrylate, Component (1) is about 20 to about 80% by weight styrene or one or more derivatives of styrene.

Component (2) is about 7.5 to about 48% by weight of a hydroxyalkyl(meth)acrylate selected from 2-hydroxyethylmethacrylate, hydroxyethylacrylate, and hydroxypropylacrylate. Mixtures of these hydroxyalkyl(meth)acrylates may also be used.

Component (3) is about 2 to about 25% by weight of a carboxyl containing monomer selected from methacrylic acid, acrylic acid, itaconic acid, and mixtures thereof. It is preferred that the amount of this component in polymer (B) is from about 4% to about 20% by weight. A more preferred amount is from about 8% to about 14% by weight. Weight percentages are based on the total amount of polymerizable components (1), (2), (3) and (4) of polymer (B).

Component (4) is optionally, up to about 60% by weight of an alkyl(meth)acrylate added into polymer (B) as an additional copolymerizable monomer. One class of suitable comonomers are acrylic and methacrylic acid esters. Acrylic and methacrylic acid esters having from 1 to about 20 carbon atoms in the alcohol moiety are commercially available or can be easily prepared by known esterification processes. Preferred esters are the methyl, ethyl, butyl, 2-ethylhexyl and lauryl esters of acrylic acid or methacrylic acid.

The acrylic and methacrylic acid esters may contain additional functional groups of the alcohol moiety, such as for example, hydroxyl, amine, halogen, ester, carboxylic acid, amide, nitrile and alkyl groups. Functionalized monomers such as blocked isocyanate acrylates and methacrylates may also be used to provide crosslinking sites for the preparation of curable systems.

Particularly useful as comonomers are lower alkyl diesters of unsaturated dicarboxylic acids. For example, $C_{1-4}$ diesters of maleic and fumaric acids, e.g., dibutyl maleate, may be used as copolymerizable monomers.

Other useful comonomers include acrylonitrile acetoacetoxyethyl methacrylate and the corresponding acrylate, and halogenated vinyl monomers such as vinyl chloride and vinylidene chloride. These monomers may be used individually or may be used as mixtures to provide the desired properties. The preferred ratios of the various monomers can be readily determined by one skilled in the art and are dependent upon the particular application and desired properties of the water-dispersible polyester blend. Of particular interest as copolymerizable monomers are monomers known to those skilled in the art to provide enhanced wet-adhesion to an aqueous ink formulation.

Polymer blends in which polymer (B) contains at least about 35 to about 100% by weight of a combination of the weight percents of repeat units of styrene or styrene derivatives, hydroxyalkyl(meth)acrylate and methacrylic acid or itaconic acid, as described herein, are preferred. The preferred total amount of optional component (4) comonomers is about 0–40 weight percent.

The aqueous polymer dispersion comprising polyester (A) and polymer (B) may preferably contain about 5–40% by weight of polyester (A) and about 95–60% by weight of polymer (B), both percentages being based on the combined weight of polyester (A) and polymer (B). A more preferred concentration is about 10–25% of polyester (A) and about 90–75% of polymer (B).

The compositions of the present invention are prepared as aqueous dispersions. The monomers of polymer (B) are generally added to an aqueous dispersion of the water-dispersible polyester (A) and polymerized by free radical initiation using conventional emulsion or suspension polymerization processes. The preferred ratio of polyester to monomers in the dispersion prior to polymerization may vary and depends on the intended application.

The polymerization can be initiated by a water-soluble or water-dispersible free radical initiator known in the art such as sodium persulfate, or by an oil-soluble initiator such as benzoyl peroxide. Other useful initiators include initiators such as ammonium persulfate, sodium metabisulfite, and redox initiators such as sodium formaldehyde sulfoxylate/Fe/hydrogen peroxide. The concentration of the initiator will generally range from about 0.01% to about 0.5% based on total reaction weight.

Although a surfactant is not necessary for stabilization of the aqueous dispersion of the present invention, the use of a surfactant or a combination of surfactants is not excluded. A list of surfactants, including suggested applications, is available in the treatise: McCutcheon's Emulsifiers & Detergents, North American Edition and International Edition, MC Publishing Co., Glen Rock, N.J., 1993.

The water-dispersible polyester blend dispersions which are prepared by the process of the present invention can be prepared at final total solids levels up to about 45 percent to 65 percent. A total solids content of about 25 percent to 45 percent is preferred. The increase in solids level is achieved during polymerization by controlling the amount of water, if any, which is added along with the monomer. By decreasing the amount of water added during polymerization, increased total solids content, up to about 50 percent to 65 percent, is possible. This increase in solids level offers significant benefits for the use of the water-dispersible polyesters of the present invention.

Copolymerization of styrene and acrylate monomer(s) in the presence of water-dispersible polyester may be conducted batch wise, semi-batch or in a continuous manner.

In a preferred embodiment, a sulfonate group-containing polyester is prepared, generally by melt phase polymerization techniques which are well known in the art. The polymers as prepared may be directly dispersed in hot water or extended into rods and chopped into pellets. These pellets can later be dispersed in hot water if desired. An aqueous dispersion containing about 5 to 35 weight %, preferably from about 10 percent to 30 percent total solids, is prepared from the polyester directly. A mixture of one or more monomers and polymerization initiators may then be added to the aqueous dispersion of the polyester and polymerization initiated to produce the aqueous polymer dispersion of the present invention. When using a persulfate initiator, for example, a polymerization is generally conducted at a temperature of about 70° C. to about 90° C. Usually a small amount of initiator is added toward the end of the copolymerization in order to react as much of the styrene, hydroxyethyl(meth)acrylate or hydroxypropylacrylate monomer and methacrylic, acrylic or itaconic acids. It is desirable to have less than 100 part per million (ppm) of unreacted vinyl/acrylic monomer(s) in the final product and preferably less than 50 ppm unreacted monomer(s). The aqueous polymer dispersion so produced can be prepared with total solids contents from about 10 percent to about 65 percent.

In another mode of operation, some of the aqueous polyester dispersion may be added to the reaction vessel while the vinyl monomers and initiator are dispersed in another portion of the polyester dispersion. It is preferred, for safety reasons, that the initiator is not mixed with the monomers but added separately, although concurrently, from the dispersion containing the monomers. After heating the reaction mixture to the desired temperature, the portion containing the polyester, the vinyl monomers and the initiator is gradually added with stirring. The translucent latex obtained has virtually no coagulum.

The aqueous dispersion prepared in this manner may be used directly as a paper adhesive or coating. A viscosity control agent, a colorant, a dye, or a stabilizer, may be added to the aqueous dispersion to prepare a specific adhesive or coating.

The total solids content of the aqueous dispersion is controlled by the relative amounts of polymers which are used in the polymerization reaction and by the amount of water added during polymerization. Higher total solids contents can be obtained by increasing the amount of a monomer and decreasing the amount of polyester which are used in the polymerization reaction. It is preferred that the aqueous dispersion of the invention has a solids content of about 25 to about 45 weight %, based on the total weight of the dispersion.

It is also preferred that the amount of polyester (A) in the aqueous dispersion is from about 5 to about 40 weight %, preferably about 10 to about 30 weight %, based on the combined dry solids weight of polyester (A) and polymer (B).

The specific amount of polyester (A) and polymer (B) can be chosen by one skilled in the art depending on the specific monomers, the desired total solids content and the application for which the aqueous dispersion is intended.

An aqueous dispersion of the invention provides excellent wet block resistance in overprint varnish applications as well as excellent printability, adhesion, water-resistance and good rewetting in ink applications for paper, film, plastics (both supported and unsupported plastics) and foil. The degree of improved properties may, to some extent, depend on the actual latex composition, particularly on the composition of the styrene/ hydroxy(meth)acrylate methacrylic, acrylic or itaconic acid copolymer. The particle size of these aqueous polymer dispersions generally range from less than or equal to about 300 nm, and preferably from about 40 nm to about 200 nm.

A dispersion or blend according to this invention may be used by applying the dispersion or blend as a coating to a substrate such as paper or plastic, followed by drying to leave a residue of solids in the form of a coating. Alternately, a second substrate can be applied prior to drying to form a bond between the substrates.

The invention also provides a method of preparing a blend of polyester (A) and of the components (1), (2), (3) and optionally (4) of polymer (B), as described above; and a method of polymerizing components (1), (2), (3) and optionally (4) of polymer (B) in the presence of the polyester (A) to form a blend of polyester (A) and polymer (B) with a total solids content of up to about 60%.

Typical Polymerization Procedure

An initiator solution was prepared from 0.408 g of ammonium persulfate and 40.0 g of demineralized water. A reductant solution was prepared from 0.408 g of sodium bisulfide and 40.0 g of demineralized water. A mixture of 102.26 g of demineralized water and 50.82 g of Eastman AQ55 polyester dispersion at 33% solids, available through Eastman Chemical Company was placed in a 1,000 ml jacketed kettle body reactor equipped with a three-neck cover. The reactor was equipped with a water bath circulator, mechanical stirrer and reflux condenser. The mixture in the reactor was then heated to 65° C. and a slow nitrogen gas sweep started. A pre-emulsion mixture was prepared by mixing 189.9 g of demineralized water, 0.544 g of ammonium carbonate, 94.39 g of Eastman AQ55 polyester dispersion, 90.88 g of 2-ethylhexylacrylate, 117.27 g of styrene, 32.11 g of methacrylic acid, and 31.183 g of 2-hydroxyethylmethacrylate. Once the reactor reached 65° C., a kicker charge of initiator/reductant/catalyst was added. The kicker charge consisted of 0.10 g of ammonium persulfate in 5.0 g demineralized water, 0.10 g of sodium bisulfide in 5.0 g demineralized water, 0.550 g of 1.0% ammonium iron (II) sulfate hexahydrate in water and 0.300 g of 1.0% diammonium ethylenediaminetetraacetic acid in water.

The initiator, reductant and pre-emulsion solutions were then fed into the reactor over 150 minutes, at 65° C. Following the addition of all three solutions, the reaction was allowed to stir for an additional 60 minutes at 65° C. The final latex was then cooled, filtered through 100 mesh wire screen, and bottled. The latex was prepared at about 40% solids.

Description of Test Methodology

Rewet/Redispersibility

Formulated inks were tested on a gravure printing press equipped with a stainless tone wedge cylinder with known cell volumes. The testing was done on clay coated paper. Prior to assessing rewet characteristics of the ink, a printed control was obtained to be used for determination of a point during the rewet test at which the print quality has returned to the initial level. The press was then stopped, the doctor blade left-engaged (i.e., in contact with the cylinder) and the ink was left to dry in the sump and on the cylinder. After some period of time, drying under ambient conditions (typically 1 to 10 minutes), printing was resumed and a specimen taken to be evaluated for dried-in coverage area. Additional specimens were taken at one minute intervals to evaluate the rate at which the ink rewets on the cylinder. Performance was rated on a split scale with the maximum drying time that can be tolerated reported first and the cylinder rotation time to 100% recovery reported second. The best rewet performance, as described by this test, is indicated, for example, by a rating of 10/1 which indicates that after drying for a period of 10 minutes the initial print quality was obtained with only one minute of cylinder rotation.

Resistance Testing

Alkaline Resistance—A section of polyboard coated with ink as described above was attached to the base of a Sutherland Rub Tester. Several drops of alkaline "line tube" solution (typically 1% of sodium salt of a long chain aliphatic carboxylic acid adjusted to a pH of 11) were placed on the ink film. Another section of unprinted polyboard was attached to a four-pound weight and placed face-to-face over the ink film. The polyboard sections were then rubbed together for twenty-five strokes and the degree of ink remover and evaluated on a scale of 1–5, a higher number indicating the resistance properties. The results are reported as an average of at least four measurements.

Water Resistance—Test procedure was essentially identical to the alkaline resistance test except that demineralized water was placed on the ink film and the polyboard sections rubbed together for two hundred strokes. The results are reported as an average of at least four measurements.

EXAMPLE 1

Preparation of an Aqueous Dispersion of the Invention

An initiator solution was prepared from 0.408 g of ammonium persulfate and 40.0 g of demineralized water. A reductant solution was prepared from 0.408 g of sodium bisulfite and 40.0 g of demineralized water. A mixture of 102.26 g of demineralized water and 50.82 g of Eastman AQ55 polyester dispersion, (33% solids) was placed in a 1000 ml jacketed kettle body reactor equipped with a 3-neck cover. The reactor was equipped with a water bath circulator, mechanical stirrer, and reflux condenser. The mixture in the reactor was then heated to 65° C. and a slow nitrogen gas sweep started. A pre-emulsion mixture was prepared by mixing 189.9 g of demineralized water, 0.544 g of ammonium carbonate, 94.39 g of Eastman AQ55 polyester dispersion, 90.88 g of 2-ethylhexyl acrylate, 117.27 g of styrene, 32.11 g of methacrylic acid, and 31.83 g of 2-hydroxyethyl methacrylate. Once the reactor reached 65□C, a kicker charge of initiator/reductant/catalyst was added. The kicker charge consisted of 0.10 g of ammonium persulfate in 5.0 g demineralized water, 0.550 g of 1.0% ammonium iron (II) sulfate hexahydrate in water and 0.300 g of 1.0% diammonium ethylenediaminetetraacetic acid in water. The initiator, reductant and pre-emulsion solutions were then fed into the reactor over 150 minutes. Following the addition of all 3 solutions, the reaction was allowed to cook for an additional 60 minutes at 65° C. The final latex was then cooled, filtered through 100 mesh wire screen, and bottled. All latexes were prepared at 40% solids.

EXAMPLE 2
Resistance Characteristics of Inks Using Aqueous Dispersion

Immediately prior to coating with ink, the polyboard substrate was preheated for 20 seconds in a forced air oven at 100° C. A pigmented ink formulation containing 37.0 grams polymer latex as described in Table 1, 48.0 grams of pigment dispersion (containing 35 wt % pigment), 5.0 grams water, 5.0 grams glycerine, 3.0 grams 620 VF wax, available through Micropowders; 1.0 grams sulfonyl 104PG50 surfactant, available through Air Products; 1.0 grams DC51 wetting agent, available through Dow Coming; 0.02 grams DC65 defoamer, available through Dow Coming; and 0.01 grams DF75 defoamer, available through Daniels Products; was coated onto the substrate using a lexographic hand proofer Pamarco 165Q anilox 7.5 vol, available through Pamarco. The ink films were then dried in a 100° C. forced air oven for 60 seconds to simulate 24 hour cure conditions. The results of resistance and rewet testing are summarized in Table 1. The polymers for Samples 2a–e were prepared according to Example 1 with varying amounts of methacrylic acid (MAA) as indicated in Table 1. All polymers had a Tg of 30° C.

TABLE 1

| Sample | wt % MAA in latex | Water Resistance | Alkaline Resistance | Rewettability |
|---|---|---|---|---|
| 2a | 0.0 | 1.8 | 4.5 | 3/10-0% recovery |
| 2b | 4.7 | 3.0 | 4.8 | 10/5 |
| 2c | 7.1 | 1.3 | 4.3 | 10/1 |
| 2d | 9.4 | 2.8 | 4.8 | 10/2 |
| 2e | 11.8 | 2.0 | 4.8 | 10/3 |

EXAMPLE 3
Replacement Of Methacrylic Acid In Example 2b With Acrylic Acid (Same Wt % Acid Functional Monomer Level And Tg)

An initiator solution was prepared from 0.408 g of ammonium persulfate and 40.0 g of demineralized water. A reductant solution was prepared from 0.408 g of sodium bisulfite and 40.0 g of demineralized water. A mixture of 102.26 g of demineralized water and 50.82 g of Eastman AQ55 polyester dispersion, (33% solids) was placed in a 1000 ml jacketed kettle body reactor equipped with a 3-neck cover. The reactor was equipped with a water bath circulator, mechanical stirrer, and reflux condenser. The mixture in the reactor was then heated to 65° C. and a slow nitrogen gas sweep started. A pre-emulsion mixture was prepared by mixing 189.9 g of demineralized water, 0.544 g of ammonium carbonate, 94.39 g of Eastman AQ55 polymer dispersion, 90.88 g of 2-ethylhexyl acrylate, 117.27 g of styrene, 25.58 g of acrylic acid, and 38.37 g of 2-hydroxyethyl methacrylate. Once the reactor reached 65° C., a kicker charge of initiator/reductant/catalyst was added. The kicker charge consisted of 0.10 g of ammonium persulfate in 5.0 g demineralized water, 0.10 g of sodium bisulfite in 5.0% demineralized water, 0.550 g of 1.0% ammonium iron (II) sulfate hexahydrate in water and 0.300 g of 1.0% diammonium ethylenediaminetetraacetic acid in water. The initiator, reductant and Pre-emulsion solutions were then fed into the reactor over 150 minutes. Following the addition of all 3 solutions, the reaction was allowed to cook for an additional 60 minutes at 65° C. The final latex was then cooled, filtered through 100 mesh wire screen, and bottled.

EXAMPLE 4
Replacement Of Methacrylic Acid In Polymer With Itaconic Acid (2.5% Acid Functionality Due To Lower Solubility Of ITA, Same Tg As In Example 2)

An initiator solution was prepared from 0.408 g of ammonium persulfate and 40.0 g of demineralized water. A reductant solution was prepared from 0.408 g of sodium bisulfite and 40.0 g of demineralized water. A mixture of 102.26 g of demineralized water 6.53 g itaconic acid (ITA) and 50.82 g of Eastman AQ55 polyester dispersion, (33% solids) was placed in a 1000 ml jacketed kettle body reactor equipped with a 3-neck cover. The reactor was equipped with a water bath circulator, mechanical stirrer, and reflux condenser. The mixture in the reactor was then heated to 65° C. and a slow nitrogen gas sweep started. A pre-emulsion mixture was prepared by mixing 189.9 g of demineralized water, 0.544 g of ammonium carbonate, 94.39 g of Eastman AQ55 polyester dispersion, 80.27 g of 2-ethylhexyl acrylate, 127.89 g of styrene, 57.41 g of 2-hydroxyethyl methacrylate. Once the reactor reached 65° C., a kicker charge of initiator/reductant/catalyst was added. The kicker charge consisted of 0.10 g of ammonium persulfate in 5.0 g demineralized water, 0.10 g of sodium bisulfite in 5.0% demineralized water, 0.550 g of 1.0% ammonium iron (II) sulfate hexahydrate in water and 0.300 g of 1.0% diammonium ethylenediaminetetraacetic acid in water. The initiator, reductant and pre-emulsion solutions were then fed into the reactor over 150 minutes. Following the addition of all 3 solutions, the reaction was allowed to cook for an additional 60 minutes at 65° C. The final latex was then cooled, filtered through 100 mesh wire screen, and bottled.

EXAMPLE 5
Resistance/Formulation Characteristics As A Function Of Type Of Acid Functionality In Latex Immediately prior to coating with ink, the polyboard substrate was preheated for 10 seconds in a forced air oven at 100° C. A pigmented ink formulation containing 39.7 g polymer latex shown in Table 2 (pH raised to 7.5 by addition of ammonium hydroxide), 48.0 g of pigment dispersion (containing 35 wt % pigment), 7.0 g water, 3.0 g butyl dipropanol (mono n-butyl ether of dipropylene glycol), 3.0 g Micropowders 620 VF wax, 1.0 g Air Products Surfynol 104PG50 surfactant, 1.0 g Dow Coming DC51 wetting agent, 0.02 g Dow Coming DC65 defoamer, and 0.01 g Daniels Products DF75 defoamer was coated onto the substrate using a flexographic hand proffer (Pamarco 165Q anilox 7.5 vol). The ink films were then dried in a 100° C. forced air oven for 60 seconds to simulate 24 hour cure conditions. The results of stability, resistance and rewet testing are summarized in Table 2.

TABLE 2

| Example | Viscosity[1] | Water Resistance | Alkaline Resistance | Rewettability |
|---|---|---|---|---|
| 3 | gelled | N/A | N/A | N/A |
| 4 | 17 seconds | 4.0 | 4.0 | 3/5 |
| 2d | 15 seconds | 4.0 | 4.0 | 3/5 |

[1]measured using #3 Zahn cup

At the same acid level, the acrylic acid example gelled after formulation. It is believed that if the acrylic acid level was lowered (for example, to the same level used in the itaconic acid Example 4) the results would be consistent for all three acids.

Although the present invention has been described with reference to specific details of certain embodiments thereof, it is not intended that such details should be regarded as limitations upon the scope of the invention except insofar as they are included in the accompanying claims.

Modifications and variations of the present invention are possible in light of the above teachings. It is therefore to be understood that within the scope of the appended claims, the invention may be practiced otherwise than as specifically described herein.

What is claimed is:

1. An aqueous dispersion comprising:
   (A) a polyester having carbonyloxy linking groups in a linear molecular structure wherein up to 80% of the linking groups may be carbonylamido linking groups, said polyester comprising the reaction products of:
      (1) at least one difunctional aromatic, saturated aliphatic or saturated alicyclic dicarboxylic acid;
      (2) at least one difunctional sulfomonomer containing at least one metal sulfonate group attached to aromatic nucleus wherein the functional groups are hydroxy or carboxyl present in an amount from about 4 to about 25 mol %, based on a total of all acid and hydroxyl equivalents being equal to 200 mol %;
      (3) at least one difunctional reactant selected from a glycol or a mixture of a glycol and diamine having two —NRH groups, the glycol containing two —CH$_2$—OH groups; and
      (4) optionally, a difunctional reactant selected from a hydroxycarboxylic acid having one —CR$_2$—OH, an aminocarboxylic acid having one —NRH group, an aminoalcohol having one —CR$_2$—OH group and one —NRH or mixtures thereof, wherein each R is an H atom or an alkyl group of 1 to 4 carbon atoms; and
   (B) a polymer having repeat units from:
      (1) about 20 to about 80% by weight of styrene or one or more derivatives of styrene;
      (2) about 7.5 to about 48% by weight of a hydroxy (alkyl)methacrylate selected from the group consisting of 2-hydroxyethylmethacrylate, hydroxyethylacrylate, and hydroxypropylacrylate;
      (3) about 2 to about 25% by weight of a carboxyl group containing monomer selected from the group consisting of methacrylic acid, acrylic acid, itaconic acid and mixtures thereof; and
      (4) optionally, about 0 to about 60% by weight of alkyl(meth)acrylate;
said aqueous dispersion containing about 5–40% of polyester (A) and about 95–60% of polymer (B), both percentages being based on the combined weights of polyester (A) and polymer (B).

2. The aqueous dispersion of claim 1 wherein said dicarboxylic acid of polyester (A) is isophthalic acid.

3. The aqueous dispersion of claim 1 wherein said sulfomonomer of polyester (A) is 5-sodiosulfoisophthalic acid.

4. The aqueous dispersion of claim 1 wherein said difunctional reactant of polyester (A) is a poly(ethylene glycol) having the structural formula:

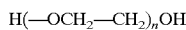

H(—OCH$_2$—CH$_2$)$_n$OH wherein n is an integer of between about 2 to about 20, present in an amount of at least 15 mol % based on the total mol % of hydroxy or hydroxy and amino equivalents.

5. The aqueous dispersion of claim 1 where said hydroxyalkyl(meth)acrylate of polymer (B) is selected from the group consisting of 2-hydroxyethylmethacrylate, hydroxyethylacrylate, and hydroxypropylacrylate.

6. The aqueous dispersion of claim 1 wherein said hydroxyalkyl(meth)acrylate of polymer (B) is 2-hydroxyethylmethacrylate.

7. The aqueous dispersion of claim 1 wherein said carboxyl group containing monomer of polymer (B) is present in an amount from about 4 to about 20% by weight of total solids present in polymer (B).

8. The aqueous dispersion of claim 1 wherein said carboxyl group containing monomer of polymer (B) is present in an amount from about 8 to about 14% by weight of total solids present in polymer (B).

9. The aqueous dispersion of claim 1 wherein said carboxyl group containing monomer of polymer (B) is methacrylic acid.

10. The aqueous dispersion of claim 1 wherein said carboxyl group containing monomer of polymer (B) is acrylic acid.

11. The aqueous dispersion of claim 1 wherein said carboxyl group containing monomer of polymer (B) is itaconic add.

12. The aqueous dispersion of claim 1 having a solids content of about 25 to about 45 wt % based on total weight of the dispersion.

13. The aqueous dispersion of claim 1 having a particle size of less than or equal to about 300nm.

14. The aqueous dispersion of claim 1 having a particle size of about 40nm to about 200nm.

15. The aqueous dispersion of claim 1 wherein said polyester (A) has repeat units of isophthalic acid, 5-sodiosulfoisophthalic acid, diethylene glycol, and another glycol selected from at least one of ethylene glycol and 1,4-cylcohexanedimethanol; and said polymer (B) contains at least about 35% to about 100% by weight of repeat units of styrene or one or more derivatives of styrene, hydroxyalkyl(meth)acrylate, and methacrylic acid or itaconic acid.

16. A method for coating a substrate with an aqueous dispersion comprising steps of:
   (i) forming an aqueous dispersion, comprising:
      (A) a polyester having carbonyloxy linking groups in a linear molecular structure wherein up to 80% of the linking groups may be carbonylamido linking groups, said polyester comprising the reaction products of:
         (1) at least one difunctional aromatic, saturated aliphatic or saturated alicyclic dicarboxylic acid;
         (2) at least one difunctional sulfomonomer containing at least one metal sulfonate group attached to aromatic nucleus wherein the functional groups are hydroxy or carboxyl present in an amount from about 4 to about 25 mol %, based on a total of all acid and hydroxyl equivalents being equal to 200 mol %;
         (3) at least one difunctional reactant selected from a glycol or a mixture of a glycol and diamine having two —NRH groups, the glycol containing two —CH$_2$—OH groups; and
         (4) optionally, difunctional reactant selected from a hydroxycarboxylic acid having one —CR$_2$—OH, an aminocarboxylic acid having one —NRH group, an aminoalcohol having one —CR$_2$—OH group and one —NRH or mixtures thereof, wherein each R is an H atom or an alkyl group of 1 to 4 carbon atoms; and
      (B) a polymer having repeat units from:

(1) about 20 to about 80% by weight of styrene or one or more derivatives of styrene;
(2) about 7.5 to about 48% by weight of a hydroxyalkyl(meth)acrylate selected from the group consisting of 2-hydroxyethylmethacrylate, hydroxyethylacrylate, and hydroxypropylacrylate;
(3) about 2 to about 25% by weight of a carboxyl group containing monomer selected from the group consisting of methacrylic acid, acrylic acid, itaconic acid and mixtures thereof; and
(4) optionally, about 0 to about 60% by weight of alkyl(meth)acrylate; said aqueous dispersion containing about 95–60% of polymer (B) and about 5–40% of polyester (A), both said percentages being based on the combined weight of (A) and (B); and (ii) coating said substrate with said aqueous dispersion.

17. The method of claim 16 wherein said carboxyl group containing monomer of polymer (B) is itaconic acid.

18. The method of claim 16, wherein said carboxyl group containing monomer of polymer (B) is methacrylic acid.

19. The method of claim 16 wherein said aqueous dispersion is an ink.

* * * * *